No. 753,965. PATENTED MAR. 8, 1904.
E. A. EMMERLING.
STAMP AFFIXER AND ENVELOP SEALER.
APPLICATION FILED JAN. 12, 1903.
NO MODEL.
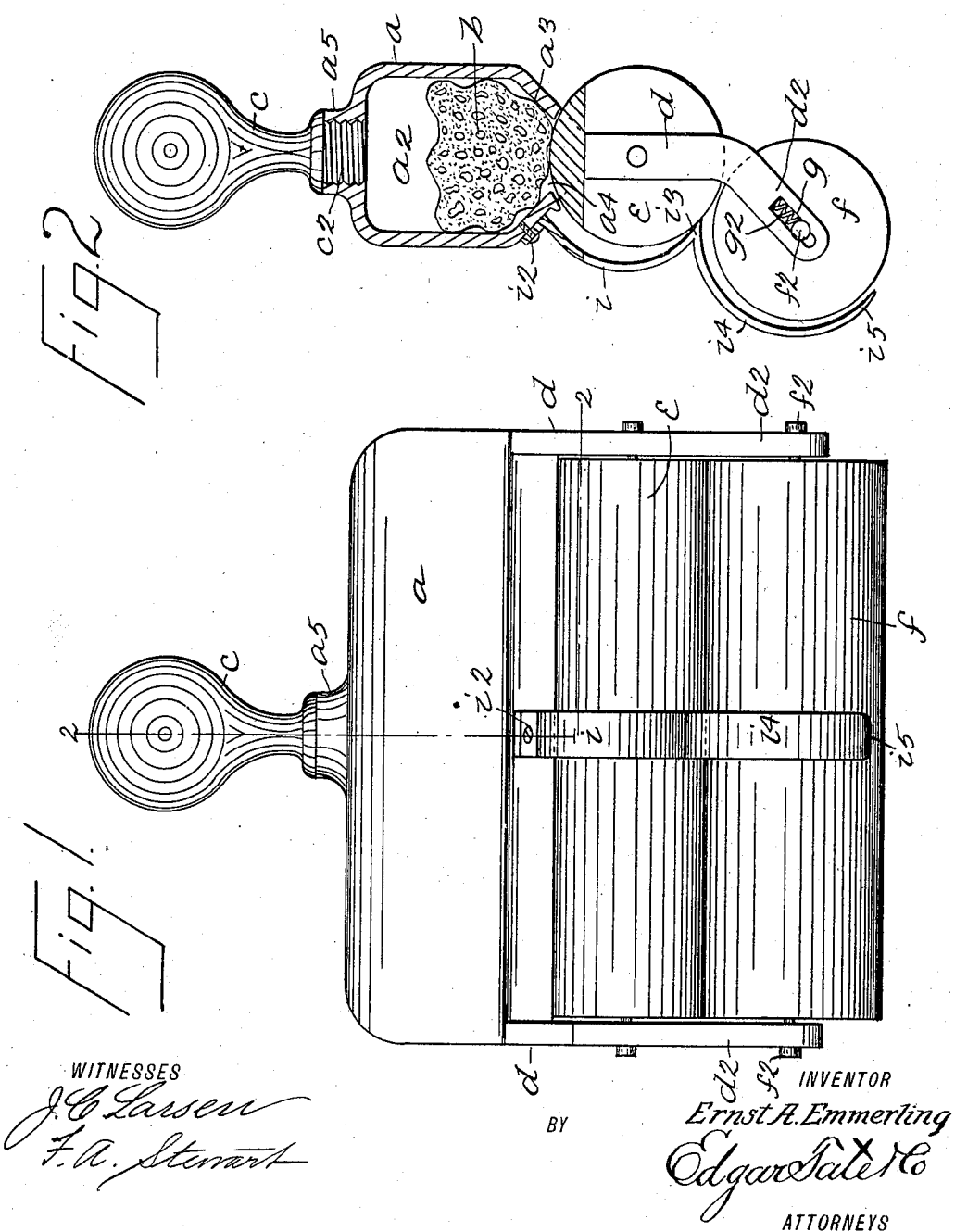
WITNESSES
J. C. Larsen
F. A. Stewart
INVENTOR
Ernst A. Emmerling
BY
Edgar Tate & Co
ATTORNEYS
THE NORRIS PETERS CO., PHOTO-LITHO., WASHINGTON, D. C.

No. 753,965.

Patented March 8, 1904.

UNITED STATES PATENT OFFICE.

ERNST A. EMMERLING, OF NEW YORK, N. Y.

STAMP-AFFIXER AND ENVELOP-SEALER.

SPECIFICATION forming part of Letters Patent No. 753,965, dated March 8, 1904.

Application filed January 12, 1903. Serial No. 138,620. (No model.)

*To all whom it may concern:*

Be it known that I, ERNST A. EMMERLING, a citizen of the United States, residing at New York, in the county of New York and State of New York, have invented certain new and useful Improvements in Stamp-Affixers and Envelop-Sealers, of which the following is a specification, such as will enable those skilled in the art to which it appertains to make and use the same.

The object of this invention is to provide an improved stamp-affixer device which may also be used as an envelop-sealer; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a front view of my improved stamp-affixer, and Fig. 2 a section on the line 2 2 of Fig. 1.

In the practice of my invention I provide a device of the class specified which comprises a transverse head portion $a$, which is oblong in form and provided with a central chamber $a^2$ and the sides of which are inclined inwardly at the bottom, as shown at $a^3$, and the bottom portion of which is open between said inwardly-inclined side portion, as shown at $a^4$. In the chamber $a^2$ is placed a sponge or other absorbent substance $b$, and the head portion $a$ is provided centrally of the top thereof with a neck $a^5$, with which is connected a handle $c$, having a screw-threaded shank $c^2$, adapted to be screwed into said neck, and the sponge $b$ may be moistened at any time by removing the handle $c$ and pouring water into the chamber $a^2$.

The head portion $a$ is provided at its opposite sides with parallel arms $d$, having forwardly-directed extensions $d^2$, and mounted between the arms $d$ is a roller $e$, and another roller $f$ is mounted in the extension $d^2$ of the arms $d$, and the shaft $f^2$ of the roller $f$ passes at each end through longitudinal slots $g$, formed in the extensions $d^2$ of the arms $d$, and between the inner ends of which and the said shaft $f^2$ are placed springs $g^2$, the object of these springs being to force the roller $f$ downwardly and outwardly.

Secured to the front of the bottom portion of the head $a$ and centrally thereof is a spring-arm $i$, this connection being made at $i^2$, and the arm $i$ is segmental in form, or substantially so, and is provided with an inwardly-directed projection $i^3$, which is directed between the rollers $e$ and $f$ and adjacent to the roller $e$, as clearly shown in Fig. 2, and said arm is also provided with a segmental extension $i^4$, which curves outwardly and downwardly and around the front portion of the roller $f$ and the end $i^5$, of which is closely adjacent to the front bottom portion of said roller. The rollers $e$ and $f$ may be made of any desired material, and it will be understood that the roller $e$ is moistened by the sponge $b$, or this operation of moistening the roller $e$ may be performed in any desired manner by means of any suitable material or device placed within the head $a$, and in the operation of applying a stamp the roller $e$ is turned while the surface thereof is moistened, and this operation may be performed by simply pressing said roller or the back thereof on any surface and moving the device forward. The stamp is then passed between the rollers $e$ and $f$, as indicated by the arrow $x$, the gummed side thereof being adjacent to the roller $e$. In this operation the roller $f$ is pressed on the surface of the envelop to which it is desired to apply the stamp, and as the stamp passes between the rollers $e$ and $f$ the front edge thereof is turned downwardly around the roller $f$ by the extension $i^4$ of the arm $i$, and the said stamp passes on and is pressed onto the envelop by the roller $f$, the gummed surface of said stamp being next to the envelop over which said roller $f$ is passed, as will be readily understood. In the normal position of the rollers $e$ and $f$ the roller $f$ is slightly separated from the roller $e$, as shown in Fig. 2; but when said roller $f$ is pressed on an envelop in the operation of passing a stamp between said rollers, as above described, the said roller $f$ is forced upwardly against the operation of the springs $d^2$ and the said roller $f$ is pressed against the stamp, which is caught between the rollers *e* and *f* and carried through and applied to the envelop, as hereinbefore described. In the operation of sealing an envelop the roller *e* is passed over the gummed surface of the flap of the envelop, and the flap is then turned over in the usual manner and is pressed onto the back of the envelop in the usual manner or by the roller *f*. The drawings forming part of this specification are made on a much enlarged scale and in practice the rollers *e* and *f* will be made of such size that the front end of said stamp as it passes through the rollers *e* and *f* will be applied to the envelop before the other end of said stamp is fully passed between said rollers, and the object of the extension $i^4$ of the arm *i* is to aid in curving the stamp around the roller *f* and applying it in proper position to the envelop.

Having fully described my invention, what I claim as new, and desire to secure by Letters Patent, is—

1. A device of the class described comprising a head portion having an internal chamber open at the bottom, parallel arms connected with said head portion and provided with forwardly-directed extensions, a roller mounted between said arms and movable adjacent to said opening, another roller mounted between the extensions of said arms and adapted to operate in connection with the first-named roller, and a curved spring-arm secured to said head at the front thereof and provided with an inwardly-directed member adjacent to the bottom front portion of the first-named roller and a segmentally-curved end portion which passes partially around the last-named roller, said last-named roller being provided with spring-bearings by which it is normally separated from the first-named roller, substantially as shown and described.

2. A device of the class described comprising a head portion having an internal chamber open at the bottom, parallel arms connected with said head portion and provided with forwardly-directed extensions, a roller mounted between said arms and movable adjacent to said opening another roller mounted between the extensions of said arms and adapted to operate in connection with the first-named roller, and a curved spring-arm secured to said head at the front thereof and provided with an inwardly-directed member adjacent to the bottom front portion of the first-named roller and a segmentally-curved end portion which passes partially around the last-named roller, substantially as shown and described.

In testimony that I claim the foregoing as my invention I have signed my name, in presence of the subscribing witnesses, this 9th day of January, 1903.

ERNST A. EMMERLING.

Witnesses:
J. C. LARSEN,
T. A. STEWART.